United States Patent [19]

Sunaga

[11] Patent Number: 5,327,035
[45] Date of Patent: Jul. 5, 1994

[54] VIBRATOR MOTOR FOR A WIRELESS SILENT ALERTING DEVICE

[75] Inventor: Sosuke Sunaga, Isesaki, Japan

[73] Assignee: Tokyo Parts Industrial Co., Ltd., Isesaki, Japan

[21] Appl. No.: 56,369

[22] Filed: Apr. 30, 1993

[30] Foreign Application Priority Data

Oct. 1, 1992 [JP] Japan .................. 4-286987

[51] Int. Cl.$^5$ .................. H02K 7/06; H02K 1/22
[52] U.S. Cl. .................. 310/81; 310/40 MM; 310/261
[58] Field of Search ............ 310/40 MM, 81, 82, 216, 310/261, 193; 318/114; 340/311.1, 407; 128/34, 35, 36

[56] References Cited

U.S. PATENT DOCUMENTS

| 2,688,102 | 8/1954 | Jackson | 310/81 |
| 4,644,201 | 2/1987 | Tani et al. | 310/51 |
| 4,864,276 | 9/1989 | Tribbey et al. | 340/407 |
| 5,036,239 | 7/1991 | Yamaguchi | 310/81 |
| 5,057,731 | 10/1991 | Hancock | 310/261 |
| 5,107,155 | 4/1992 | Yamaguchi | 310/81 |

FOREIGN PATENT DOCUMENTS

| 193686 | 3/1991 | Japan . | |
| 153444 | 2/1992 | Japan . | |
| 294482 | 9/1992 | Japan . | |
| 2246913 | 2/1992 | United Kingdom | 310/40 MM |
| 8501620 | 4/1985 | World Int. Prop. O. . | |

*Primary Examiner*—Steven L. Stephan
*Assistant Examiner*—C. Laballe
*Attorney, Agent, or Firm*—Kenjiro Hidaka

[57] ABSTRACT

A vibrator motor has an armature rotor whose center of mass is off the axis of the shaft thereof. The rotor includes at least three poles each having an winding arm and an arcuate pole blade. All of the blades have an equal length and are disposed angularly evenly about the axis of the shaft so that all of the blade-to-blade spacings are equal. At least one winding arm is angularly out of alignment with the dimensional center of the arcuate blade of the corresponding pole, or, the size and the mass of at least one arm is different from those of any other arms, or, the mass of at least one of armature windings is different from the mass of any other armature winding, or, a weight is fixedly attached to the rotor in an eccentric manner either between two armature poles or on the shaft.

8 Claims, 2 Drawing Sheets

VIBRATOR MOTOR FOR A WIRELESS SILENT ALERTING DEVICE

BACKGROUND OF THE INVENTION

1. Field of the Invention

This invention relates to a self-vibrating motor used for a wireless silent alerting device or a massager.

2. Description of the Prior Art

One of the prior known vibrator motors is shown in FIG. 4. In FIG. 4, a vibrator motor M has an output shaft S on which an eccentric weight W, made of copper-tungsten alloy etc., is mounted. Some danger of mechanical interference pertains to this type of vibrator motor since the rotating eccentric weight is located outside the motor case. In addition, the motor requires an extra space in which the eccentric weight turns.

In Japanese laid-open patent application, application No. 2-294482 (application date Oct. 31, 1990), which has been assigned to the assignee of the present invention, discloses a vibrator motor in which one of ordinarily three armature poles is deleted and the rotor has two armature poles angularly spaced at 120° each other. However, this type of vibrator motor has a large cogging effect and, therefore, requires comparatively high voltage to obtain a large power for starting the rotation in order to overcome the cogging effect. Such vibrator motor is less suitable for a battery-operated pocket type alerting device.

U.S. Pat. No. 5,036,239 (issued Jul. 30, 1991) assigned to the assignee of the present invention discloses a miniature flat vibrator motor employing a flat eccentric rotor which is rotatably supported by a pair of bearings.

In the case of a miniature flat motor having a very small thickness, the coaxial alignment tolerance between the two bearings must be made extremely small in order to maintain a proper clearance between the rotor and the housing. Obtaining such a small positional tolerance of the bearings, extremely small machining tolerances of the components are required.

SUMMARY OF THE INVENTION

It is a primary object of the present invention to provide a small vibrator motor having no outside eccentric weight and requiring small voltage and power for starting of the motor.

In order to achieve the object, the vibrator motor of the present invention has an armature rotor including iron core having at least three poles each having a radially extending winding arm and an arcuate armature pole blade. The blades are equal in arcuate length and are angularly arranged at an equal pitch angle, which is 360° divided by the number of the poles, but the winding arms are arranged at uneven pitch angles, so that the mass of the armature rotor is off the axis of the rotor shaft. The armature winding of the pole toward which the center of the mass of the rotor is shifted is of a heavier gage wire than those of the other poles, or the number of turn of the same winding is greater than those of the other poles, or a part of the armature windings is deleted. In an alternative embodiment, the arm or arms of one or more armature poles toward which the center of mass of the rotor is shifted are made thicker than the other arm or arms. In an additional embodiment, an eccentric weight other than the armature core is added to the rotor.

Since the center of mass of the rotor of the vibrator motor is off the axis of the rotor shaft, the motor vibrates as the rotor rotates. On the other hand, since the armature pole blades are angularly evenly disposed, the starting torque of the rotor is small, its cogging effect is little, and, therefore, the motor can be operated on a low voltage.

DETAILED DESCRIPTION OF THE PREFERRED EMBODIMENTS

The invention will now be described in detail with reference to the drawings.

Figure 1A:
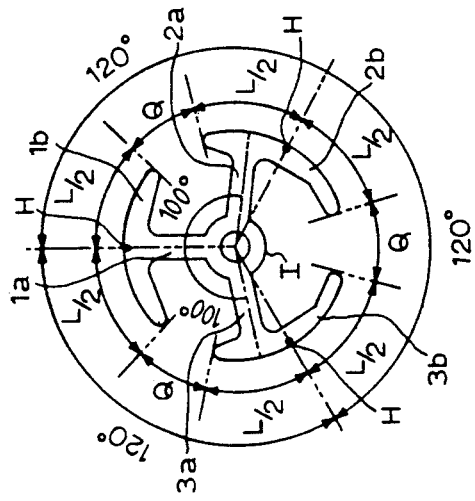
FIG. 1a is a cross-sectional view of an armature iron core of the vibrator motor shown in FIG. 1, which defines the positions of winding arms and blades of the iron core.
Figure 1:
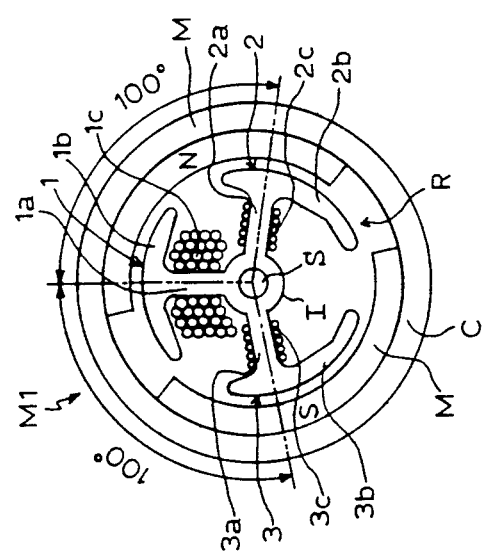
FIG. 1 is a cross-sectional view of a vibrator motor according to a first embodiment of the present invention.

FIG. 1 is a cross sectional view of a vibrator motor according to the first embodiment of the present invention. In FIG. 1, a vibrator motor Ml has a case C, a pair of stator magnets M, M attached to the case C, and a rotor R. The rotor R includes an integrally formed three-pole armature iron core I, a shaft S, and first, second and third armature windings 1c, 2c and 3c, respectively. The three-pole armature iron core I consists of a first pole core 1, a second pole core 2 and a third pole core 3. The first pole core 1 consists of a first radially extending winding arm 1a and a first arcuate blade 1b; the second pole core 2 consists of a second radially extending winding arm 2a and a second arcuate blade 2b; and the third pole core 3 consists of a third radially extending winding arm 3a and a third arcuate blade 3b. The first, the second and the third armature windings 1c, 2c, and 3c, respectively, are wound on the first, the second and the third arms 1a, 2a and 3a, respectively.

FIG. 1a is a cross-sectional view of the armature iron core I of the vibrator motor shown in FIG. 1.

As shown in FIG. 1a, all of the arcuate lengths (L) of the first blade 1b, the second blade 2b and the third blade 3b are equal and the dimensional centers (H) in the arcuate direction of the arcuate blades 1b, 2b and 3b are disposed angularly spaced at 120° from each other, whereby all of the blade-to-blade spacings (Q) are equal. However, the axes of the second arm 2a and the third arm 3a are disposed angularly at 100° from the axis of the first arm 1a. Thus, although the section of the first pole core 1 is symmetrical with respect to its axis, the sections of the second and the third pole cores 2 and 3 have individually an asymmetrical "ice-ax" shape, as shown in FIGS. 1 and 1a. Furthermore, the second and the third pole cores 2 and 3 are symmetrically disposed with respect to the axis of the first pole core 1. Consequently, the center of the total mass of the first, the second and the third arms 1a, 2a and 3a is located off the axis of the rotor shaft S toward the first pole core 1, whereby the center of the mass of the three-pole iron core I is also located off the axis of the rotor shaft S toward the first pole core 1.

Referring to FIG. 1, the mass of the first armature winding 1c is greater than those of the second and the third armature windings 2c and 3c, so that the center of the total mass of the first, the second and the third windings 1c, 2c and 3c is also located off the axis of the rotor shaft S toward the first pole core 1. This is achieved by using a heavier gage wire for the first winding 1c than for the second and the third windings 2c and 3c, and/or, making the number of turn of the first winding 1c greater than those of the second and the third windings 2c and 3c. An additional method of increasing the eccentricity of the center of the total mass of the windings is to use a copper wire for the first winding 1c and aluminum wires, whose specific gravity is considerably smaller than that of copper, for the second and the third windings 2c and 3c. A further method of increasing the eccentricity of the center of the total mass of the windings is to eliminate either of the second winding 2c or the third winding 3c.

Figure 2B:
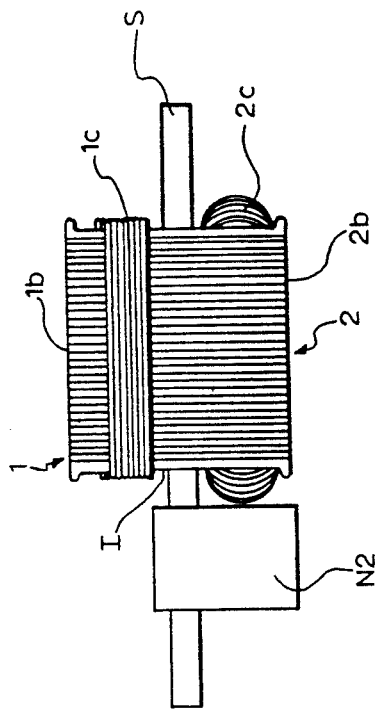
FIG. 2b is a side view of a rotor of the vibrator motor of the second embodiment, but in an alternative mode.
Figure 2:
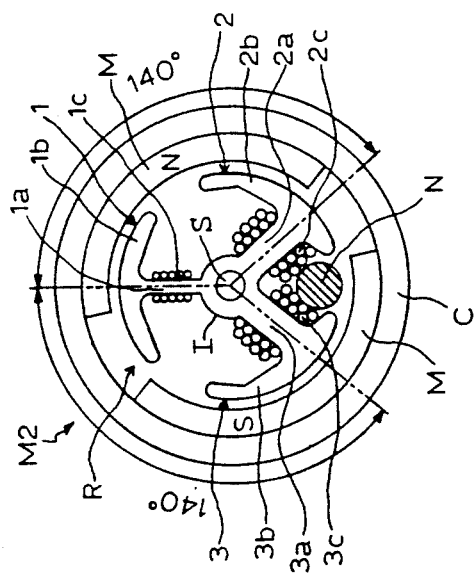
FIG. 2 is a cross-sectional view of a vibrator motor according to a second embodiment of the present invention.

FIG. 2 is a cross-sectional view of a vibrator motor M2 according to a second embodiment of the present invention. The basic construction of the motor M2 is similar to the one of the motor M1 of the first embodiment. Like reference characters denote the like components in FIGS. 1 and 2.

The rotor R of the vibrator motor M2 additionally includes an elongated lead weight N fixedly disposed between the second pole core 2 and the third pole core 3 in parallel with the shaft S. The other differences between the motor M1 and the motor M2 are the angular arrangement of the second and the third arms 2a and 3a, the size and the mass of the second and the third arms 2a and 3a as compared to the size and the mass of the first arm 1a, and the gage and the number of turn of the second and the third windings 2c and 3c as compared to those of the first winding 1c.

Still referring to FIG. 2, all of the arcuate lengths of the first blade 1b, the second blade 2b and the third blade 3b are equal and the centers in the arcuate direction of the arcuate blades 1b, 2b and 3b are disposed angularly spaced at 120° from each other, as in the case of the first embodiment. However, the axes of the second arm 2a and the third arm 3a are disposed angularly at 140° from the axis of the first arm 1a. The section of the first pole core 1 is symmetrical, the sections of the second and the third pole cores 2 and 3 have an asymmetrical "ice-ax" shape. In addition, the size and the mass of the second and the third arms 2a and 3a are greater than the size and the mass of the first arm 1a. Consequently, the center of the total mass of the first, the second and the third arms 1a, 2a and 3a is located off the axis of the rotor shaft S, but away from the first pole core 1, as opposed to the case of the first embodiment.

Furthermore, the mass of each of the second and the third windings 2c and 3c is greater than that of the first winding 1c, as opposed to the case of the first embodiment, so that the center of the total mass of the first, the second and the third windings 1c, 2c and 3c is also located off the axis of the rotor shaft S, away from the first pole core 1. This is achieved by using a heavier gage wire for the second and the third windings 2c and 3c than for the first winding 1c, and/or, making the number of turn of the second and the third windings 2c and 3c greater than that of the first winding 1c, and/or, using copper wires for the second and the third windings 2c and 3c and an aluminum wire for the first winding 1c. A further method of increasing the eccentricity of the center of the total mass of the windings is to eliminate the first winding 1c.

Figure 2A:
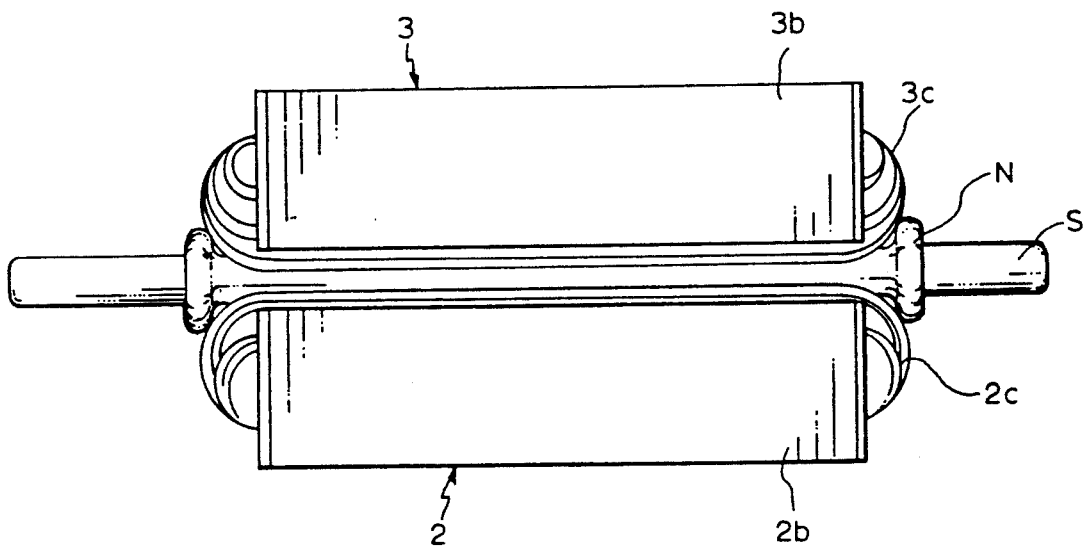
FIG. 2a is a side view of a rotor of the vibrator motor of the second embodiment.

FIG. 2a is a side view of the rotor R of the vibrator motor M2 shown in FIG. 2. Referring to FIGS. 2 and 2a, the elongated lead weight N is fixedly disposed between the second pole core 2 and the third pole core 3. The lead weight N additionally causes the center of the mass of the rotor R to shift away from the first pole core 1. The lead weight N can be fixedly disposed between the second pole core 2 and the third pole core 3 easily by being squeezed on both the ends, as shown in FIG. 2a.

FIG. 2b is a side view of a rotor of the vibrator motor of the second embodiment, but in an alternative mode. Like reference characters denote the like components in FIGS. 2, 2a and 2b.

In FIG. 2b, instead of the elongated weight N disposed between the second pole core 2 and the third pole core 3, as shown in FIGS. 2 and 2a, an eccentric weight N2 is fixedly mounted on the shaft S and on one side of the iron core I in the manner that the center of the mass of the weight N2 is on the opposite side of the first pole core 1 with respect to the axis of the shaft S. A proper material of the eccentric weight N2 is an alloy containing a small amount of tungsten having a specific gravity of about 13. The eccentric weight N2 increases the eccentricity of the center of the mass of the rotor R.

Figure 3:
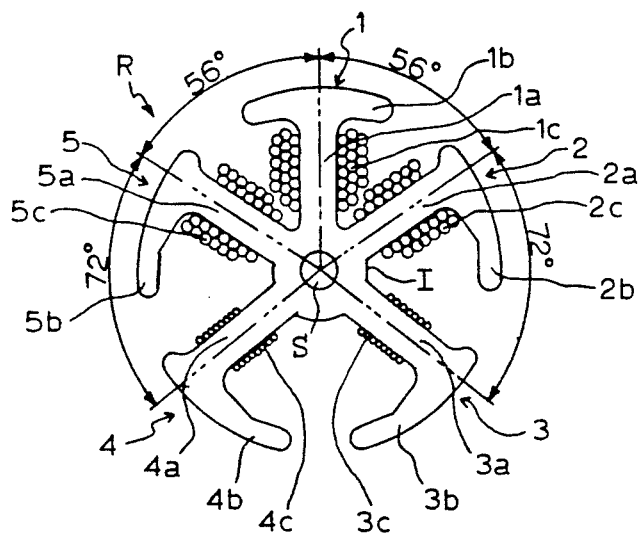
FIG. 3 is a cross-sectional view of a rotor of a vibrator motor according to a third embodiment of the present invention.
Figure 4:
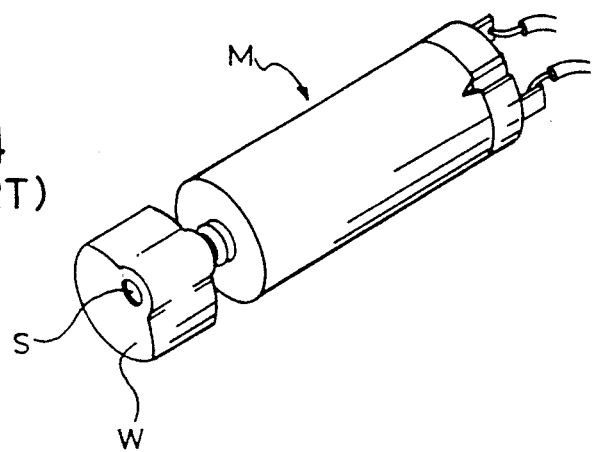
FIG. 4 is a perspective view of a prior known vibrator motor.

FIG. 3 is a cross-sectional view of a rotor R of a vibrator motor according to a third embodiment of the present invention.

In FIG. 3, the rotor R includes an integrally formed five-pole armature iron core I, a shaft S, and first, second, third, fourth and fifth armature windings 1c, 2c, 3c, 4c and 5c, respectively. The five-pole armature iron core I consists of a first pole core 1, a second pole core 2, a third pole core 3, a fourth pole core 4 and a fifth pole core 5. The first pole core 1 consists of a first radially extending winding arm 1a and a first arcuate blade 1b; the second pole core 2 consists of a second radially extending winding arm 2a and a second arcuate blade 2b; the third pole core 3 consists of a third radially extending winding arm 3a and a third arcuate blade 3b; the fourth pole core 4 consists of a fourth radially extending winding arm 4a and a fourth arcuate blade 4b; and the fifth pole core 5 consists of a fifth radially extending winding arm 5a and a fifth arcuate blade 5b. The first, the second, the third, the fourth and the fifth armature windings 1c, 2c, 3c, 4c and 5c, respectively, are wound on the first, the second, the third, the fourth and the fifth arms 1a, 2a and 3a, 4a and 5a, respectively.

In FIG. 3, all of the arcuate lengths of the first blade 1b, the second blade 2b, the third blade 3b, the fourth blade 4b and the fifth blade 5b are equal and the dimensional centers in the arcuate direction of the arcuate blades 1b, 2b, 3b, 4b and 5b are disposed angularly equally spaced at 72° (360°/5), whereby all of the blade-to-blade spacings are also equal. However, the axes of the second arm 2a and the fifth arm 5a are angularly disposed at 56° from the axis of the first arm 1a, and the axes of the third arm 3a and the fourth arm 4a are angularly disposed at 72° from the axes of the second arm 2a and the fifth arm 5a, respectively, as shown in FIG. 3. Thus, although the first pole core 1 is symmetrical, all of the other four pole cores 2, 3, 4 and 5 have an asymmetrical "ice-ax" shape. Consequently, the center of the mass of the iron core I is located off the axis of the rotor shaft S toward the first pole core 1.

Still referring to FIG. 3, a heavier gage wire is used for the first, the second and the fifth windings 1c, 2c and 5c than for the third and the fourth windings 3c and 4c. The number of turn of the first winding 1c is greater than that of the second and the fifth windings 2c and 5c, and the number of turn of the third and the fourth windings 3c and 4c is less than that of the second and the fifth windings 2c and 5c. This winding method additionally causes the center of the mass of the rotor R to be shifted off the axis of the rotor shaft S toward the first pole core 1. In an alternative design, either the third winding 3c or the fourth winding 4c may be eliminated in its entirety.

Since other components of the vibrator motors of the present invention, such as a commutator and lead wires, are the same as conventional types, no specific descriptions or figures are given on such other components.

The effect of the present invention will now be explained. Since the center of mass of the rotors of the vibrator motors of the present invention is radially off the axis of the rotor, the motor vibrates by itself as it rotates. On the other hand, since the arcuate lengths of all of the arcuate armature blades are equal and all of the blades are angularly evenly positioned about the axis of the rotor, the cogging effect of the motor is small, and, therefore, a low voltage power can start the motor. Furthermore, since the motor has neither eccentric weight outside the case nor output shaft, the alerting device employing the motor can be designed compact, and there is no danger of interference between a rotating eccentric weight and any other parts contained in the alerting device.

It will be understood that various changes and modifications may be made in the above described embodiments which provide the characteristics of the present invention without departing from the spirit and principle thereof particularly as defined in the following claims.

What is claimed is:

1. A vibrator motor, comprising:
an armature rotor,
said armature rotor including a shaft, an armature core fixedly mounted on said shaft, and armature windings,
said armature core having at least three poles, each of said poles having a radially extending winding arm having an radial axis and an arcuate blade, all of said arcuate blades having an equal arcuate length, dimensional centers measured in the arcuate direction of said arcuate blades being located at angularly even pitch about the axis of said shaft so that any arcuate blades adjacent to each other have an equal spacing therebetween, the radial axis of said radially extending winding arm of at least one of said poles being angularly unevenly disposed about the axis of said shaft and out of alignment with the dimensional center of said arcuate blade of the corresponding pole so that the center of means of said armature core is located off the axis of said shaft.

2. A vibrator motor, comprising:
an armature rotor,
said armature rotor including a shaft, an armature core fixedly mounted on said shaft,
said armature core having a first pole core, a second pole core and a third pole core, said first, second and third pole cores having a first winding arm, a second winding arm and a third winding arm, respectively, said first, second and third winding arms being radially extending and having a first radial axis, a second radial axis and a third radial axis, respectively, said first, second and third pole cores having a first arcuate blade, a second arcuate blade and a third arcuate blade, respectively, all of said arcuate blades having an equal arcuate length, dimensional centers measured in the arcuate direction of said arcuate blades being located at angularly even pitch of 120° about the axis of said shaft so that any arcuate blades adjacent to each other have an equal spacing therebetween, the angular spacing between said first radial axis and said second radial axis being equal to the angular spacing between said first radial axis and said third radial axis, but less than 120°, the angular spacing between said second radial axis and said third radial axis being greater than 120°, the dimensional center of said first arcuate blade being aligned with said first radial axis, the dimensional centers of said second arcuate blade and said third arcuate blade being out of alignment with said second radial axis and said third radial axis, respectively, only said first pole core thereby being symmetrically shaped with respect to said first radial axis but said second and third pole cores being asymmetrically shaped with respect to said second and third radial axes, respectively, whereby the center of mass of said armature core is located off the axis of said shaft toward said first pole core.

3. A vibrator motor according to claim 2, wherein said motor has a first winding wound on said first winding arm, a second winding wound on said second winding arm and a third winding wound on said third winding arm, a specific gravity of said first winding being greater than a specific gravity of said second and third windings.

4. A vibrator motor according to claim 3, wherein the conductor material for said first winding is copper and the conductor material for said second and third windings is aluminum.

5. A vibrator motor comprising:
an armature rotor,
said armature rotor including a shaft, an armature core fixedly mounted on said shaft, said armature core having a first pole core, a second pole core and a third pole core, said first, second and third pole cores having a first winding arm, a second winding arm and a third winding arm, respectively, said first, second and third winding arms being radially extending and having a first radial axis, a second radial axis and a third radial axis, respectively, said first, second and third pole cores having a first arcuate blade, a second arcuate blade and a third arcuate blade, respectively, all of said arcuate blades having an equal arcuate length, dimensional centers measured in the arcuate direction of said arcuate blades being located at angularly even pitch of 120° about the axis of said shaft so that any arcuate blades adjacent to each other have an equal spacing therebetween, the angular spacing between said first radial axis and said second radial axis being equal to the angular spacing between said first radial axis and said third radial axis, but greater than 120°, the angular spacing between said second radial axis and said third radial axis being less than 120°, the dimensional center of said first arcuate blade being aligned with said first radial axis, the dimensional centers of said second arcuate blade and said third arcuate blade being out of alignment with said second radial axis and said third radial axis, respectively, only said first pole core thereby being symmetrically shaped with respect to said first radial axis but with second and third pole cores being asymmetrically shaped with respect to said second and third radial axes, respectively, whereby the center of mass of said armature core is located off the axis of said shaft away from said first pole core.

6. A vibrator motor according to claim 5, wherein the size and mass of each of said second and third winding arms are greater than the size and mass of said first winding arm.

7. A vibrator motor, comprising:
an armature rotor,
said armature rotor including a shaft, an armature core fixedly mounted on said shaft,
said armature core having a first pole core, a second pole core, a third pole core, a fourth pole core and a fifth pole core, said first, second, third, fourth and fifth pole cores having a first winding arm, a second winding arm, a third winding arm, a fourth winding arm and a fifth winding arm, respectively, said first, second, third, fourth and fifth winding arms being radially extending and having a first radial axis, a second radial axis, a third radial axis, a fourth radial axis and a fifth radial axis, respectively, said first, second, third, fourth and fifth pole cores having a first arcuate blade, a second arcuate blade, a third arcuate blade, a fourth arcuate blade and a fifth arcuate blade, respectively, all of said arcuate blades having an equal arcuate length, dimensional centers measured in the arcuate direction of said arcuate blades being located at angularly even pitch of 72° about the axis of said shaft so that any arcuate blades adjacent to each other have an equal spacing therebetween, the angular spacing between said first radial axis and said second radial axis being equal to the angular spacing between said first radial axis and said fifth radial axis, the angular spacing between said second radial axis and said third radial axis being equal to the angular spacing between said fourth radial axis and said fifth radial axis, the angular spacing between said second radial axis and said third radial axis being greater than the angular spacing between said first radial axis and said second radial axis, the angular spacing between said third radial axis and said fourth radial axis being greater than the angular spacing between said second radial axis and said third radial axis, the dimensional center of said first arcuate blade being aligned with said first radial axis, the dimensional centers of said second, third, fourth and fifth arcuate blades being out of alignment with said second, third, fourth and fifth radial axes, respectively, only said first pole core thereby being symmetrically shaped with respect to said first radial axis but said second, third, fourth and fifth pole cores being asymmetrically shaped with respect to said second, third, fourth and fifth radial axes, respectively, whereby the center of mass of said armature core is located off the axis of said shaft toward said first pole core.

8. A vibrator motor according to claim 7, wherein said motor has a first winding wound on said first winding arm, a second winding wound on said second winding arm, a third winding wound on said third winding arm, a fourth winding wound on said fourth winding arm and a fifth winding wound on said fifth winding arm, a gage size for said first, second and fifth windings being heavier than a gage size for said third and fourth windings.

* * * * *